(12) United States Patent
Tononishi et al.

(10) Patent No.: US 10,003,054 B2
(45) Date of Patent: Jun. 19, 2018

(54) POWER SOURCE PACK

(71) Applicant: GS Yuasa International Ltd., Kyoto-shi (JP)

(72) Inventors: Masamitsu Tononishi, Kyoto (JP); Ryutaro Nishikawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 60 days.

(21) Appl. No.: 14/806,503

(22) Filed: Jul. 22, 2015

(65) Prior Publication Data
US 2016/0036022 A1 Feb. 4, 2016

(30) Foreign Application Priority Data

Jul. 31, 2014 (JP) .................. 2014-157240

(51) Int. Cl.
*H01M 2/10* (2006.01)
*H01M 2/12* (2006.01)
*H01M 10/6555* (2014.01)
*H01M 10/658* (2014.01)
*H01M 10/0525* (2010.01)
*H01G 11/10* (2013.01)

(52) U.S. Cl.
CPC ....... *H01M 2/1094* (2013.01); *H01M 10/658* (2015.04); *H01M 10/6555* (2015.04); *H01G 11/10* (2013.01); *H01M 2/12* (2013.01); *H01M 10/0525* (2013.01)

(58) Field of Classification Search
CPC ......... H01M 10/6555; H01M 10/0486; H01M 2/12; H01M 2/1094
See application file for complete search history.

(56) References Cited

U.S. PATENT DOCUMENTS

2012/0052365 A1* 3/2012 Chang ................. H01M 2/1094
429/158
2013/0183544 A1 7/2013 Yoshioka et al.

FOREIGN PATENT DOCUMENTS

| JP | 2010-113888 A | 5/2010 |
| JP | 2011-065906 A1 | 3/2011 |
| JP | 2011-129372 A | 6/2011 |
| JP | 2013-168355 A | 8/2013 |
| JP | 2014-192365 A | 10/2014 |

* cited by examiner

*Primary Examiner* — Stewart A Fraser
*Assistant Examiner* — Rachel L Zhang
(74) *Attorney, Agent, or Firm* — McGinn IP Law Group, PLLC

(57) ABSTRACT

A power source pack includes: a housing; and a power source module which is housed in the housing. The power source module includes: a cell stack including a plurality of energy storage devices each having a safety valve; and a heat insulator positioned between an inner wall of the housing and the cell stack and having an approximately flat-plate shape. The heat insulator faces the safety valves of the cell stack in an opposed manner.

18 Claims, 10 Drawing Sheets

POWER SOURCE PACK

CROSS-REFERENCE TO RELATED APPLICATIONS

This application claims the benefit of Japanese patent application No. 2014-157240, filed on Jul. 31, 2014, which is incorporated by reference.

FIELD

The present invention relates to a power source pack using energy storage devices such as secondary batteries, for example.

BACKGROUND

A secondary battery has been popularly used as a power source for electronic equipment such as a mobile phone or IT equipment in addition to an application where a primary battery is replaced with a secondary battery. Particularly, a nonaqueous electrolyte secondary battery represented by a lithium ion secondary battery possesses high energy density and hence, the application of the nonaqueous electrolyte secondary battery to electrical equipment such as an electric vehicle has been in progress.

An electrolyte solution in the secondary battery is decomposed and vaporized as the secondary battery is repeatedly charged and discharged, and the exterior of the secondary battery is expanded or deformed because of such decomposition and vaporization of the electrolyte solution. To prevent such expansion or deformation of the exterior, a safety valve which is opened at a predetermined pressure and discharges a gas in the secondary battery is mounted on the exterior of the secondary battery. Further, an assembled battery, in which a plurality of batteries are arranged and connected to each other, includes an exhaust passage which communicates with safety valves of the respective batteries and guides and discharges a gas to the outside (see JP-A-2013-168355 including FIG. 5 and FIG. 15 for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The conventional assembled battery has the following drawback. That is, the exhaust passage is provided in the form of a pipe, and is mounted on an assembled battery. Such a configuration, however, forms an undesired surplus space in a container where the assembled battery is housed, and thus making the assembled battery large-sized.

An object of the present invention to provide a power source pack capable of achieving space saving.

A first aspect of the present invention is directed to a power source pack which includes: a housing; and a power source module housed in the housing, the power source module including: a cell stack which includes a plurality of energy storage devices each having a safety valve; and a heat insulator which is positioned between an inner wall of the housing and the cell stack and has an approximately flat-plate shape, wherein the heat insulator faces the safety valves of the cell stack in an opposed manner.

BRIEF DESCRIPTION OF DRAWINGS

The foregoing and other features of the present invention will become apparent from the following description and drawings of an illustrative embodiment of the invention in which.

DESCRIPTION OF EMBODIMENTS

A first aspect of the present invention is directed to a power source pack which includes: a housing; and a power source module housed in the housing, the power source module including: a cell stack which includes a plurality of energy storage devices each having a safety valve; and a heat insulator which is positioned between an inner wall of the housing and the cell stack and has an approximately flat-plate shape, wherein the heat insulator faces the safety valves of the cell stack in an opposed manner.

A second aspect of the present invention lies in that, in the power source pack, a surface of the heat insulator and a surface of the cell stack which face each other in an opposed manner form a gas passage which guides an exhaust gas generated from the energy storage devices to an inner space of the housing.

A third aspect of the present invention lies in that, in the power source pack, the cell stack includes end plates which sandwich the plurality of energy storage devices arranged in a row, and the heat insulator is fixed to the end plates.

A fourth aspect of the present invention lies in that, in the power source pack, at least one end of the heat insulator has an end surface portion which is bent in a direction intersecting with the arrangement direction of the energy storage devices, and a communication portion which allows a gas generated from the energy storage devices to pass therethrough is formed in the end surface portion.

A fifth aspect of the present invention lies in that, in the power source pack, the end plates are fixed to the cell stack by a fastening bar extending in the arrangement direction of the energy storage devices of the cell stack, and the heat insulator is arranged on a surface of the cell stack which is on a side opposite to a side surface of the cell stack on which the fastening bar is arranged.

A sixth aspect of the present invention lies in that, in the power source pack, the heat insulator is mounted on the same side surface of the cell stack on which a connecting part which connects the energy storage devices to each other is arranged, and the heat insulator is arranged at a position equal to or lower than the highest portion of the connecting part.

A seventh aspect of the present invention lies in that, in the power source pack, the housing is hermetically closed and the inner space thereof communicates with the outside only through the exhaust port.

An eighth aspect of the present invention lies in that, in the power source pack, the heat insulator is arranged between the safety valves and an electrical component of the power source module.

The aspects of the present invention having the above-mentioned configuration has an advantageous effect that it is possible to provide a power source pack which can achieve space saving.

Hereinafter, a first embodiment of the present invention is described with reference to drawings.

First Embodiment (1. Power Source Pack)

Figure 1:
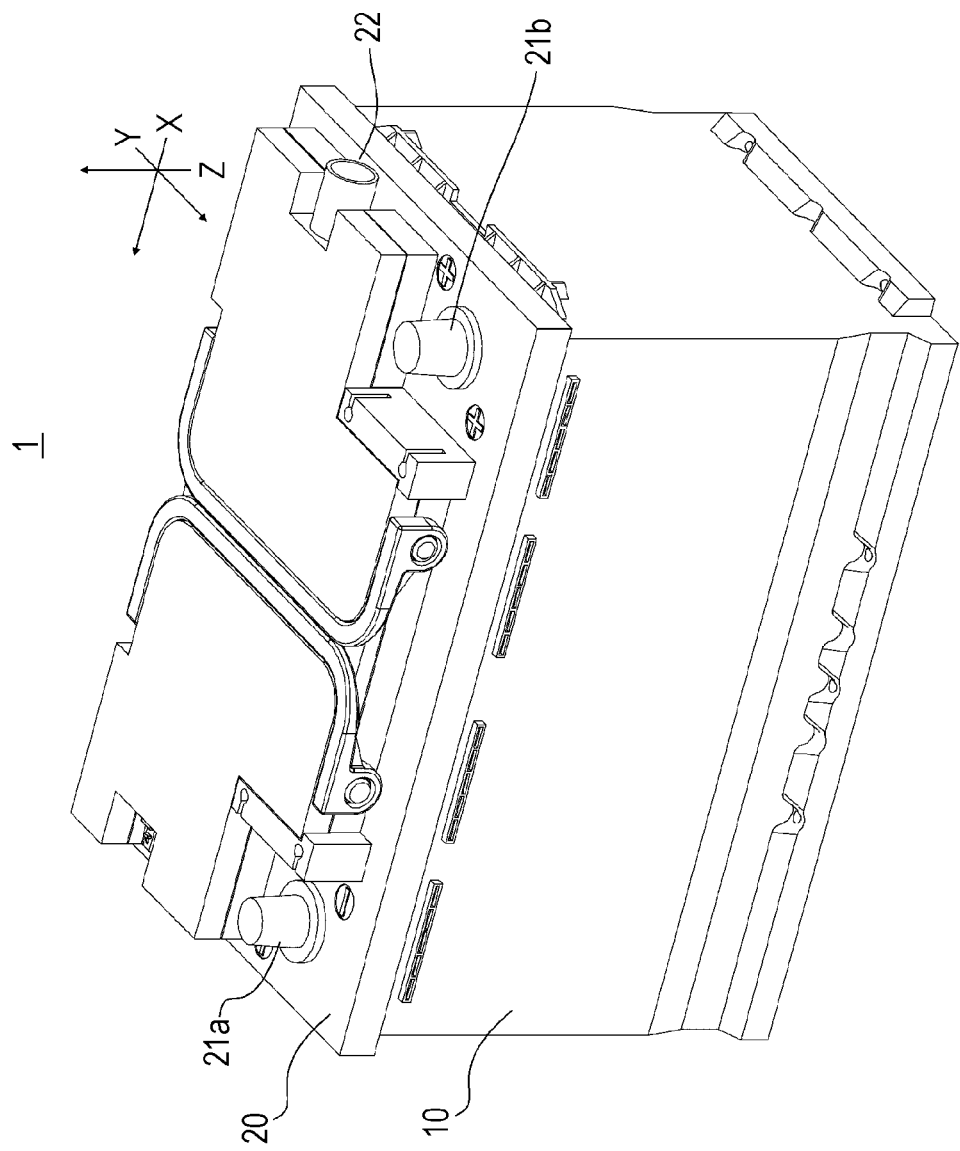
FIG. 1 is a perspective view showing a configuration of a power source pack of a first embodiment.
Figure 2:
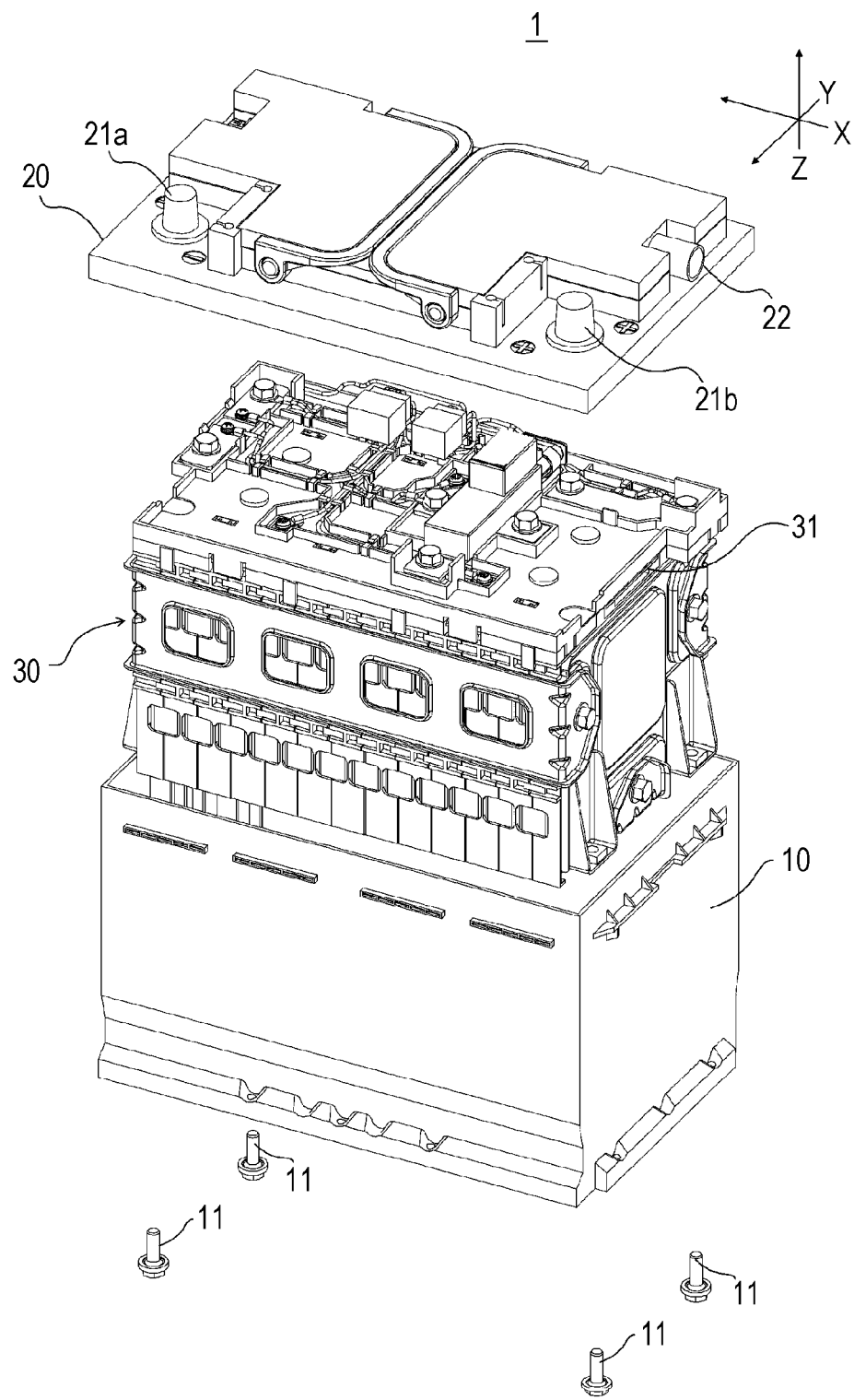
FIG. 2 is an exploded perspective view showing the configuration of the power source pack.

FIG. 1 is a perspective view showing the configuration of a power source pack 1 according to the first embodiment of the present invention, and FIG. 2 is a perspective view, with a part exploded, schematically showing the power source pack 1.

As shown in FIG. 1, the power source pack 1 includes a housing having a hexahedral shape constituted of an open box-shaped container body 10 and a lid portion 20 which are made of a synthetic resin such as polypropylene. The power source pack 1 also includes; a negative electrode terminal 21a and a positive electrode terminal 21b which are exposed from an upper surface of the lid portion 20 and are connected to an external load not shown in the drawing; and an exhaust sleeve 22 which communicates with an inner space of the housing.

As shown in FIG. 2, the power source pack 1 houses a power source module 30 in the container body 10 of the housing. The power source module 30 is fixed to an inner surface (bottom surface) of the container body 10 by bolts 11 which are inserted into through holes (not shown) formed in a bottom surface of the container body 10. The container body 10 is closed so as to keep airtightness by joining the lid portion 20 to the container body 10 by suitable means such as ultrasonic welding or heat welding. The container body 10 and the lid portion 20 may be fastened to each other using screws, bolts or the like with a gasket interposed therebetween.

Exhaust ports 31 described later are formed in both side surfaces of the power source module 30 respectively, and a gas generated from a cell stack formed by arranging a plurality of batteries is discharged through the exhaust ports 31. The whole housing has airtightness so that a gas discharged through the exhaust ports 31 stays in the housing and, thereafter, is discharged to the outside the power source pack 1 through the exhaust sleeve 22 of the lid portion 20.

Assume that the arrangement direction of batteries in the cell stack of the power source module is aligned with a straight line which is parallel to an X axis of an orthogonal coordinate system consisting of the X axis, a Y axis and a Z axis shown in FIG. 1. Also assume that the respective surfaces of the housing, the power source module 30 and the like which form the power source pack 1 are positioned approximately parallel to the X axis, the Y axis and the Z axis, respectively. Still further, in the description made hereinafter, with respect to the directions indicated by arrows in the drawings, assume that the direction extending from a right side to a left side in the drawings is the X axis direction, the direction extending from a depth side to a front side in the drawings is the Y axis direction, and the direction extending from a lower side to an upper side in the drawings is the Z axis direction.

(2. Power Source Module)

Figure 3:
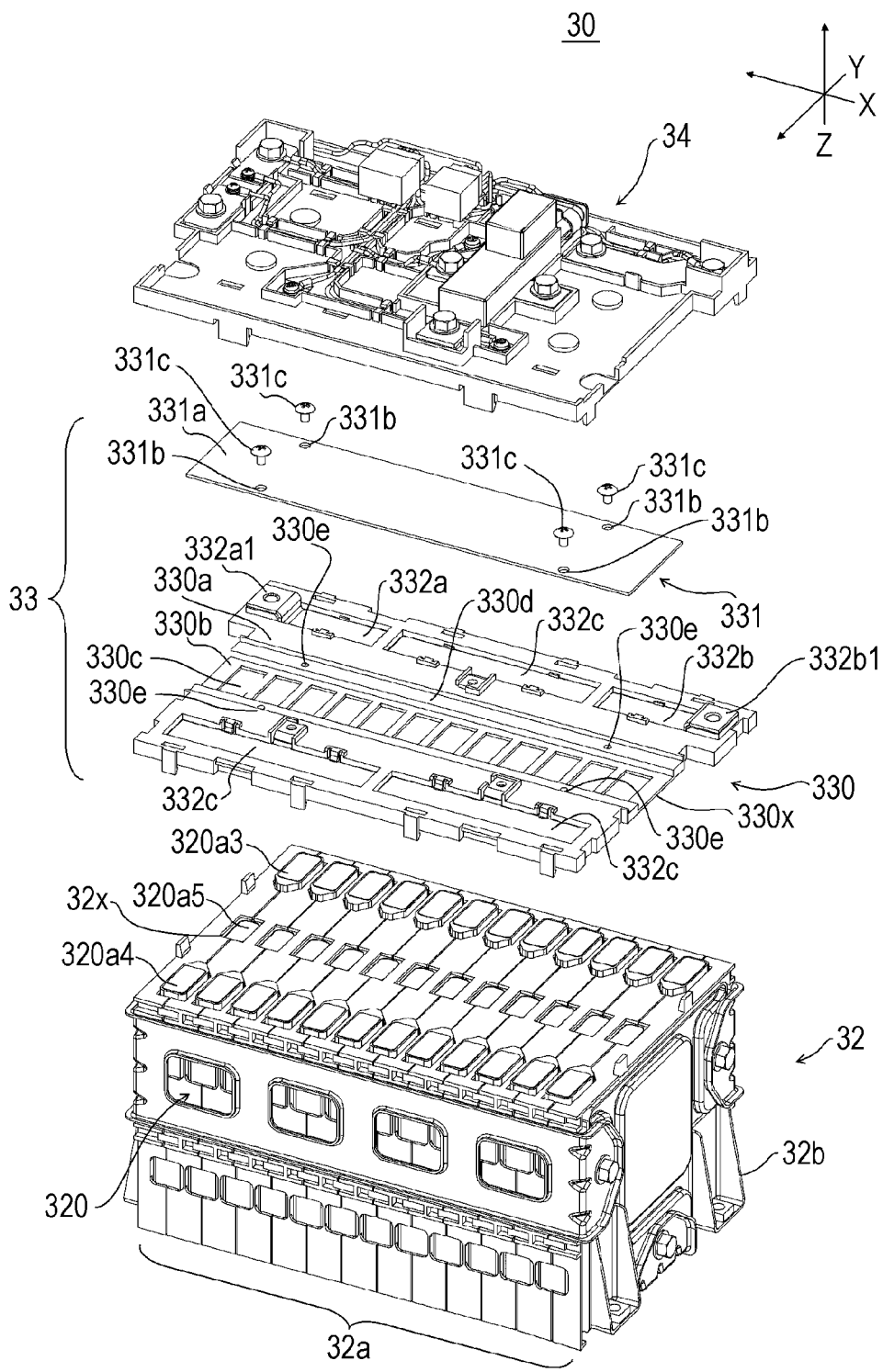
FIG. 3 is an exploded perspective view showing part of the power source pack.

FIG. 3 is a perspective view, with a part exploded, schematically showing the configuration of the power source module 30. As shown in FIG. 3, the power source module 30 includes: a cell stack 32 formed by arranging and fastening batteries such as nonaqueous electrolyte secondary batteries to each other in a row; a bus bar assembly unit 33 for electrically connecting the respective batteries of the cell stack 32 to each other; and an electrical component sub unit 34 which is electrically connected with the bus bar assembly unit 33.

The cell stack 32 includes: a cell stack body 320 described later where the plurality of batteries are arranged in a row such that a negative electrode terminal 320a3, a positive electrode terminal 320a4 and a safety valve 320a5 are disposed on an upper surface of each battery; a cover 32a which covers surfaces of the cell stack body 320 and has an insulating property; and holders 32b which are mounted on the surface of the cell stack body 320 and a surface of the cover 32a, and maintain fixed shapes of these parts.

Openings for exposing the electrode terminals 320a3, 320a4 and the safety valves 320a5 of the batteries to the outside are formed in an upper surface of the cover 32a. In the drawing, only openings 32x which expose the safety valves 320a5 are indicated by symbol.

The bus bar assembly unit 33 is a member made of a synthetic resin such as polypropylene having an insulating property and corrosion resistance against an electrolyte solution. The bus bar assembly unit 33 includes: a frame body 330a which conforms to a profile of an upper surface of the cell stack 32; and openings formed in the frame body 330a at positions corresponding to the electrode terminals 320a3, 320a4 and the safety valves 320a5 which are exposed from the cell stack 32. As a material for forming the frame body 330a, a synthetic resin such as a PBT resin having an insulating property and a heat resistant property resin may be used.

Sizes of the openings which are formed in the frame body 330a corresponding to the electrode terminals 320a3, 320a4 are set such that each opening extends between and over the electrodes arranged adjacent to each other in a straddling manner so as to control a connection pattern between electrode terminals corresponding to an electrical connection between the respective batteries. A metal bus bar 332a, a metal bus bar 332b and metal bus bars 332c which are connected to the electrode terminals 320a3 and the electrode terminals 320a4 are embedded in the openings, respectively. The bus bar 332a and the bus bar 332b are used for connecting the terminals of the cell stack 32 to each other and for connecting the cell stack 32 to the electrode terminal 21a and the electrode terminal 21b of the power source pack 1, and the bus bars 332c are used for connecting the electrode terminals of the cell stack 32 to each other.

Openings 330c which correspond to the safety valves 320a5 are formed individually in accordance with the number of batteries which form the cell stack body 320.

A groove portion 330x is formed in the frame body 330a at a position which corresponds to the openings 330c. The groove portion 330x has a two-stage step as viewed from a surface of the frame body 330a, and both ends of the groove portion 330x reach both ends of the frame body 330a. The groove portion 330x is defined by: a lower stage surface 330b which extends along the arrangement direction of the safety valves 320a5 and in which the openings 330c are formed; and intermediate stage surfaces 330d which are formed along edges of the lower stage surface 330b.

A heat insulator 331 is positioned above the groove portion 330x. The heat insulator 331 is a means which blocks heat radiated from the cell stack 32 thus reducing thermal influence on respective members forming the power source pack 1, the electrical component sub unit 34 (electrical component), the lid portion 20, and electrical components incorporated in the lid portion 20 (described later) all of which are positioned above the bus bar assembly unit 33. The heat insulator 331 is also a means for reinforcing the power source module 30. The heat insulator 331 is formed of a metal-made heat insulating body plate 331a having a rectangular shape which conforms to a profile of the groove portion 330x of the bus bar assembly unit 33. The heat insulator 331 is fitted in the intermediate stage surfaces 330d of the groove portion 330x.

The heat insulator 331 is fixed to the bus bar assembly unit 33 by threadedly engaging mounting screws 331c with mounting holes 330e formed in the frame body 330a of the bus bar assembly unit 33 through through holes 331b formed in a surface of the heat insulating body plate 331a.

The electrical component sub unit 34 is a unit which is configured such that, on a base made of a synthetic resin which is a material substantially equal to the material for forming the frame body 330a of the bus bar assembly unit 33, electrical components such as electric wires which extend via the bus bar 332a and the bus bar 332b, switches including relay switches, resistors and harnesses which are connected to the bus bars 332a, 332b and 332c are arranged. The electrical component sub unit 34 and the bus bar assembly unit 33 are electrically connected with each other by threadedly mounting bolts in mounting holes 332a1, 332b1 formed in the bus bars 332a, 332b, respectively, from an upper surface of the electrical component sub unit 34.

In the inside of the lid portion 20 which is positioned above the electrical component sub unit 34, a BMU (Battery Management Unit) is arranged as electrical components. Furthermore, an electronic part which controls charging and discharging of the power source pack 1, an electronic part which controls a state of the power source pack 1 such as a temperature of the power source pack 1, and an electronic part which allows the power source pack 1 to perform the communication with equipment to which the power source pack 1 is connected are also arranged as electrical components.

(3. Cell Stack)

Figure 4:
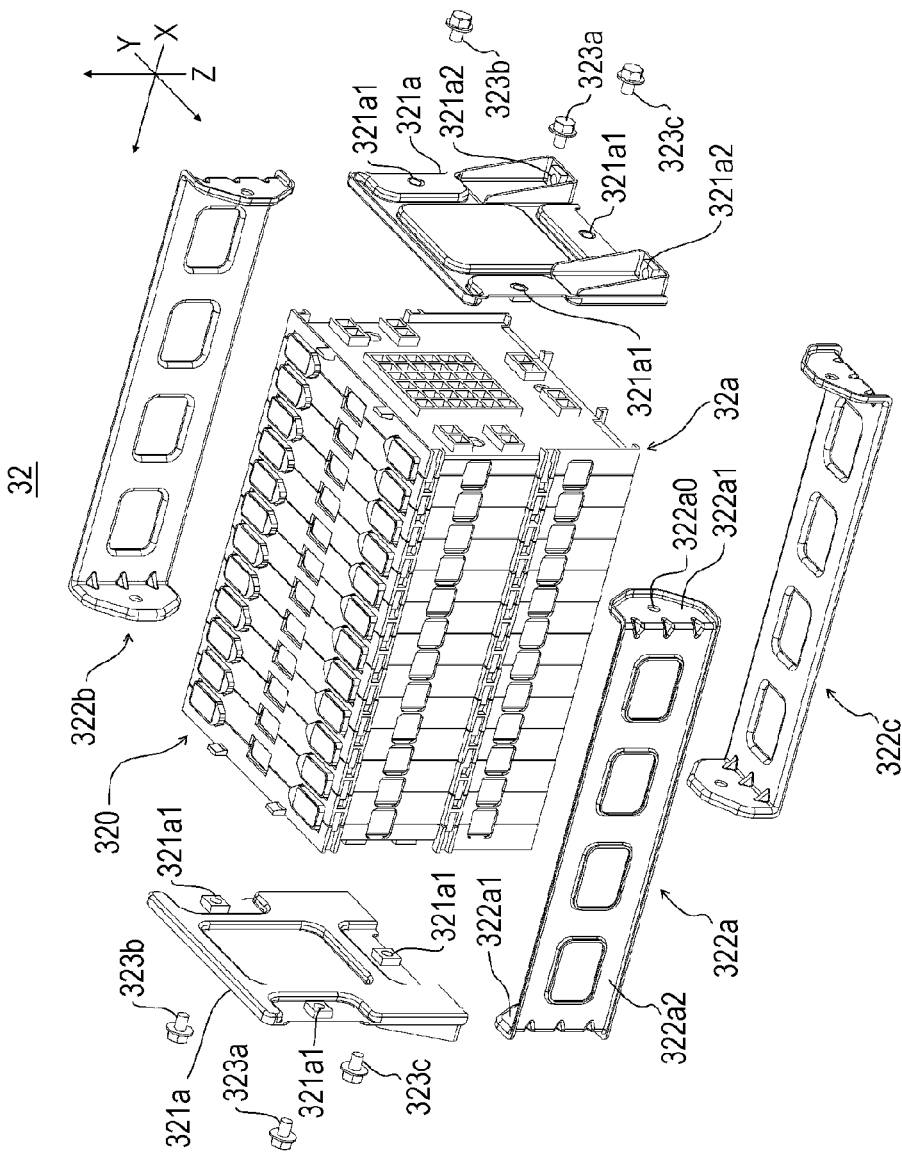
FIG. 4 is an exploded perspective view showing part of the power source pack.
Figure 5:
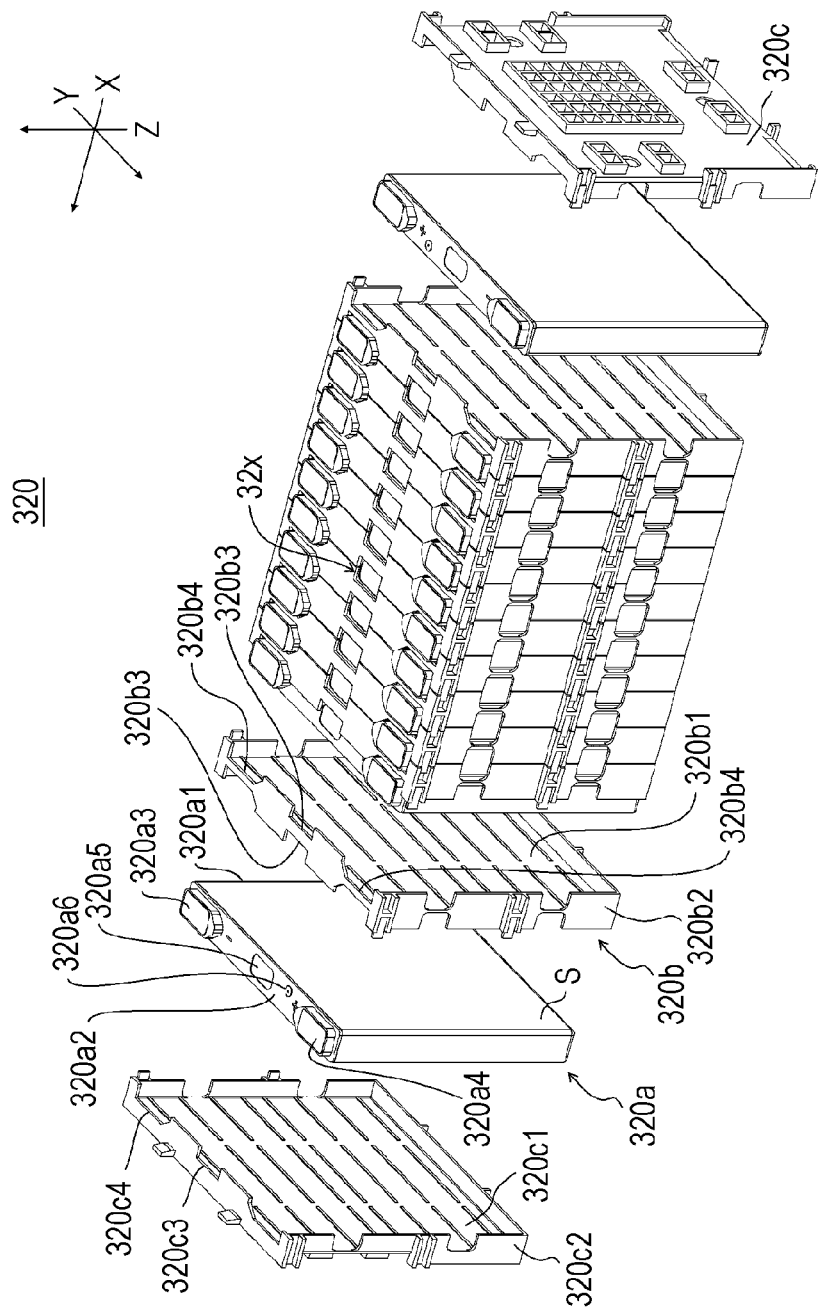
FIG. 5 is an exploded perspective view showing part of the power source pack.

FIG. 4 is a perspective view showing the configuration of the cell stack 32 with the holder 32b in an exploded state, and FIG. 5 is a perspective view showing the cell stack body 320 in an exploded state.

As shown in FIG. 4, in the cell stack 32, the cell stack body 320 and the cover 32a which are integrally formed with each other are sandwiched by a pair of end plates 321a which is arranged at both ends of the cell stack body 320 in the arrangement direction of the batteries.

Using the arrangement direction of the batteries as an axis of symmetry, a fastening bar 322a and a fastening bar 322b are symmetrically arranged on side surfaces of the cell stack body 320 parallel to a Z-X plane in the drawing with respect to the axis of symmetry. A fastening bar 322c is arranged below the axis. That is, the fastening bar 322c is arranged on a bottom surface of the cell stack body 320 which is a plane parallel to a Y-X plane in the drawing.

The fastening bars 322a to 322c have the same configuration. Hereinafter, the configuration of the fastening bars 322a to 322c is described by taking the fastening bar 322a as an example.

The fastening bar 322a includes: a pair of flat-plate-shaped fastening portions 322a1 which faces the pair of end plates 321a in an opposed manner, respectively; and an extending portion 322a2 which connects the fastening portions 322a1 to each other, and is formed along the arrangement direction of the batteries. A base material for forming the fastening bar 322a is formed by applying press working to a steel plate or the like such that the base material for forming the fastening bar 322a has an approximately U shape in cross section. A flange is formed on edges of the fastening bar 322a respectively. As one example, the fastening portions 322a1 and the extending portion 322a2 are formed by bending a single base material.

The fastening bar 322a and the end plates 321a are fixed to each other in such a manner that through holes 322a0 formed in the fastening portions 322a1 are made to overlap with the mounting holes 321a1 formed in peripheral portions of the end plates 321a, and the fastening bar 322a and the end plates 321a are fastened to each other by fastening bolts 323a. The fixing between fastening bar 322b and the end plate 321a and the fixing between the fastening bar 322c and the end plate 321a are performed in the same manner using fastening bolts 323b, 323c respectively.

Mounting holes 321a2 which open in the vertical direction are formed in a lower portion of the end plate 321a. The bolts 11 are inserted into the mounting holes 321a2 from the outside the housing, and are mounted in the mounting holes 321a2. The mounting holes 321a2 and the bolts 11 are used for fixing the power source module 30 and the container body 10 to each other.

Each one of the plurality of batteries 320a which form the cell stack body 320 as shown in FIG. 5 includes: an open box-shaped outer covering body 320a1 which is made of metal such as aluminum or stainless steel, for example, and in which an electrode assembly and an electrolyte solution are sealed; and a lid portion 320a2 which is made of a material substantially equal to a material for forming the outer covering body 320a1 and closes an opening of the outer covering body 320a1 by being welded by laser welding or the like. The electrode terminal 320a3 and the electrode terminal 320a4, the safety valve 320a5 and a sealing plug 320a6 which seals an electrolyte solution filling port are mounted on the lid portion 320a2. The battery 320a has a flat angular columnar profile shape where an upper surface and a lower surface of the battery 320a are formed of an upper surface of the lid portion 320a2 and a bottom surface of the outer covering body 320a1 which is a surface on a side opposite to the upper surface of the lid portion 320a2 respectively. In each battery 320a, surfaces of the outer covering body 320a1 may be directly exposed, or side surfaces of the outer covering body 320a1 may be covered by an insulating film except for the bottom surface of the outer covering body 320a1.

Among all side surfaces of the battery 320a, the surface having the largest area is assumed as a main surface S. The cell stack body 320 is formed by arranging the batteries 320a such that the main surfaces S of the batteries 320a arranged adjacent to each other in an opposed manner with the spacer 320b interposed therebetween.

The spacer 320b is a member made of a material having an insulating property such as a synthetic resin. The spacer 320b includes: a main plate portion 320b1 which is sandwiched between the main surfaces S of the batteries 320a; and a side plate portion 320b2 which is formed on a peripheral portion of the main plate portion 320b1, projects to both sides along the arrangement direction of the batteries 320a, and covers the top surface of the lid portion 320a2 of the battery 320a and other side surfaces of the battery 320a. Notches are formed on the side plate portion 320b2. That is, the notch 320b3 is formed on a portion of the side plate portion 320b2 which overlaps with the safety valve 320a5 of the battery 320a, and the notches 320b4 are formed on portions of the side plate portion 320b2 which interfere with the electrode terminal 320a3 and the electrode terminal 320a4.

With such a configuration, in a state where the batteries 320a and the spacers 320b are arranged so as to form the cell stack body 320, the electrode terminals 320a3 and the electrode terminals 320a4 are exposed from the upper surface of the cell stack body 320. At the same time, a pair of notches 320b3 which face each other in an opposed manner forms the opening 32x thus exposing the safety valve 320a5 from the upper surface of the cell stack body 320.

Surfaces of the batteries 320a positioned at both ends of the cell stack body 320 are covered by spacers 320c each of which includes a main plate portion 320c1 having the same shape as the main plate portion 320b1 of the spacer 320b; and a side plate portion 320c2 which is formed in a projecting manner only in the direction that the spacer 320c faces the battery 320a. With respect to the batteries 320a at both ends of the cell stack body 320, the electrode terminal 320a3, the electrode terminal 320a4 and the safety valve 320a5 of each battery 320a are exposed from the upper surface of the cell stack body 320 through a notch 320c3 and notches 320c4 formed on the side plate portion 320c2 of the spacer 320c and through the notch 320b3 and the notches 320b4 formed on the side plate portion 320b2 of the spacer 320b arranged adjacent to the spacer 320c.

In the power source pack 1 having the above-mentioned configuration, the battery 320a corresponds to the energy storage device in the present invention.

The electrical parts which constitute the electrical component sub unit 34, other electrical components and the electrical components such as electronic parts arranged in the inside of the lid portion 20 correspond to the electrical components in the present invention.

The bus bar assembly unit 33 which forms, in combination with the cell stack 32, the power source module 30 includes the heat insulator 331 which faces the safety valves 320a5 of the cell stack 32 in an opposed manner thus forming a gas passage which guides an exhaust gas generated from the cell stack 32 to the outside.

Figure 6:
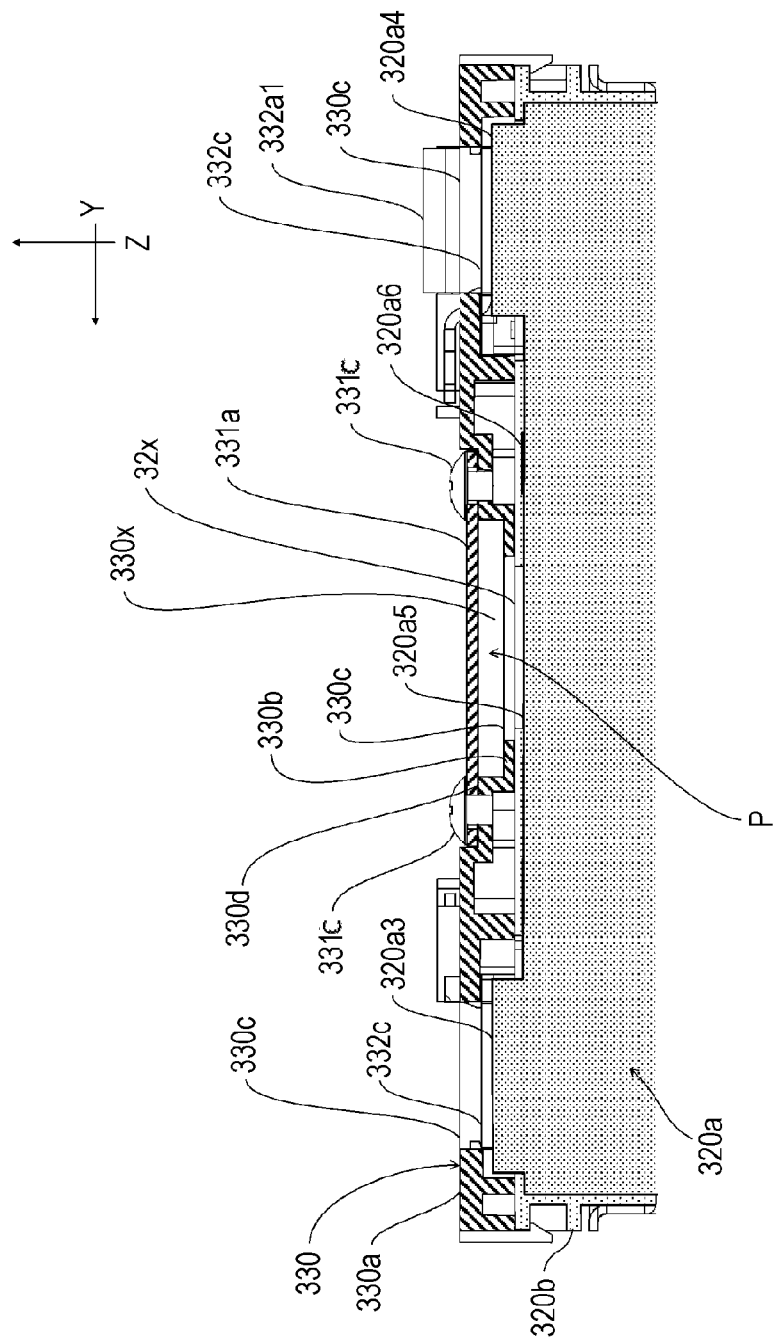
FIG. 6 is a cross-sectional view showing part of the power source pack.

That is, as shown in FIG. 3, in the power source module 30, the bus bar assembly unit 33 is stacked on the upper surface of the cell stack 32 and hence, the heat insulator 331 of the bus bar assembly unit 33 having a rectangular flat plate shape faces a surface of the cell stack 32 which includes the safety valves 320a5 of the respective batteries 320a arranged in a row with a gap formed therebetween. Further, as shown in FIG. 6 which is a cross-sectional view, the heat insulator 331 is fitted in the groove portion 330x formed on the frame body 330a of the bus bar assembly unit 33 thus forming a gas passage P which extends along the extending direction of the heat insulator 331, that is, along the arrangement direction of the safety valves 320a5 in cooperation with the upper surface of the groove portion 330x (the lower stage surface 330b and a boundary surface between the intermediate stage surface 330d and the lower stage surface 330b) and the surface of the cell stack 32 around the safety valves 320a5.

The groove portion 330x reaches the ends of the frame body 330a and hence, as shown in FIG. 2, both ends of the gas passage P are exposed to the side surfaces of the power source module 30 as a pair of exhaust ports 31, and the groove portion 330x communicates with the outside the hermetically sealed housing through the exhaust sleeves 22.

In a conventional assembled battery (cell stack), an exhaust passage which guides an exhaust gas from safety valves of batteries is mounted on a cell stack as an independent member such as a pipe. Accordingly, the exhaust passage occupies the inside of a container (housing) and forms an undesired surplus space thus making a power source pack including a housing large-sized.

To the contrary, in the first embodiment, the gas passage P is formed by making use of the bus bar assembly unit 33 which is used for electrically connecting the batteries to each other. Accordingly, a gas can be discharged to the outside the housing without forming an undesired surplus space in the inside of the housing thus achieving space saving of the power source pack. To be more specific, as shown in FIG. 6, with respect to the heat insulating body plate 331a of the heat insulator 331 which defines the gas passage P, the highest portion of the heat insulating body plate 331a is arranged at a position lower than the frame body 330a of the bus bar assembly unit 33 or at a position lower than a portion of the bus bar 332a where the mounting hole 332a1 is formed. With such a configuration, there is no possibility that the additional formation of the gas passage P affects portions of the power source pack occupied by other members or parts. Accordingly, the configuration can achieve space saving of the power source pack thus contributing to the miniaturization of the power source pack, and to the increase of a capacity of the cell stack. In the description made heretofore, the bus bar 332a and the frame body 330a correspond to the connecting part in the present invention. Although the highest portion of the heat insulating body plate 331a of the heat insulator 331 is positioned lower than the frame body 330a or the bus bar 333a in this embodiment, the highest portion of the heat insulating body plate 331a of the heat insulator 331 may be positioned at the same height as the frame body 330a or the bus bar 333a. Such configuration can acquire substantially the same advantageous effect. That is, it is sufficient that the highest portion (upper surface) of the heat insulator 331 is disposed at a position lower than whichever higher one of the highest portion of the bus bar 332a and the highest portion of the frame body 330a. Further, a height of the heat insulator 331 can be further reduced by using flat head screws as the mounting screws 331c. Accordingly, such a configuration is more desirable. It is preferable that the highest portion of the heat insulator be disposed at a position lower than the highest portion of the bus bar and lower than the highest portion of the frame body.

In the above-mentioned description, "large" in the upward direction, that is, in the Z axis direction in the drawing means "high" in the present invention. The Z axis direction is the direction orthogonal to the lid portion 320a2, and is also the direction away from the lid portion 320a2.

A heat insulator in the present invention corresponds to the upper surface of the heat insulating body plate 331a in this embodiment. To be more specific, the heat insulator in the present invention corresponds to the portion of the heat insulator mounted at the highest position in the Z axis direction.

Further, the gas passage of this embodiment is defined by the metal heat insulator 331 which is positioned between the cell stack 32 and the electrical component sub unit 34. Accordingly, even when heat is generated during the operation of the cell stack 32 or even when an exhaust gas of a high temperature is discharged from the cell stack 32, it is possible to reduce the influence of such heat exerted on the electrical component sub unit 34 and the electrical components positioned above the bus bar assembly unit 33.

Further, the gas passage of this embodiment is defined by the metal-made heat insulator 331 assembled into the bus bar assembly unit 33 and hence, it is possible to increase mechanical strength of the power source module 30 including the bus bar assembly unit 33.

In the above-mentioned description, a gas passage in the present invention corresponds to the gas passage P, and the gas passage P is defined by: the heat insulator 331 assembled into the bus bar assembly unit 33; the frame body 330a of the bus bar assembly unit 33; and the surfaces of the lid portions 320a2 of the batteries 320a around the safety valves 320a5 (corresponding to the surfaces of the lid portions 320a2 which face the cell stack in an opposed manner in the present invention). The batteries 320a form the cell stack 32, and are arranged in a row.

It is sufficient that the gas passage in the present invention is constituted of a surface of the heat insulator and a surface of the cell stack which face each other in an opposed manner. The gas passage in the present invention is not limited by other specific configurations of the power source pack.

Figure 7:
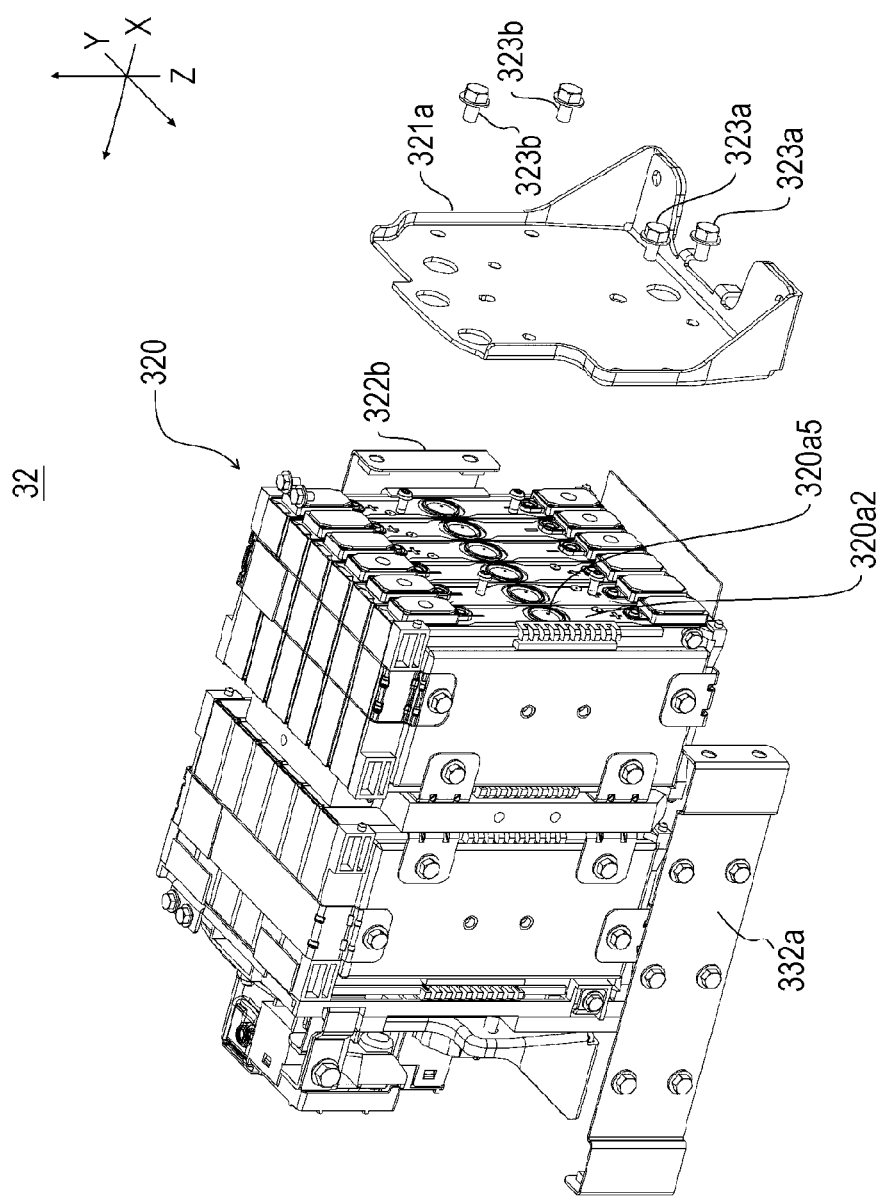
FIG. 7 is an exploded perspective view showing part of another example of the power source pack of the first embodiment.

To be more specific, as in the case of a cell stack 32 shown in FIG. 7, a cell stack body 320 is configured such that lid portions 320a2 on which safety valves 320a5 are mounted face an end plate 321a in an opposed manner as an opposedly facing surface of a cell stack in the present invention. In such a configuration, by using the end plate 321a which forms a holder together with a fastening bar 322a and a fastening bar 322b as a heat insulator in the present invention, this configuration can also acquire substantially the same advantageous effect as the first embodiment. In this case, a gas discharged from the safety valves 320a5 of the cell stack body 320 impinges on the end plate 321a so that the direction of the flow of the gas is changed, and the gas flows along a surface of the end plate 321a, is diffused into the inside of a housing, and is discharged to the outside from exhaust sleeves 22. FIG. 7 shows the example where no member is disposed between the cell stack body 320 and the end plate 321a. However, an insulating spacer, a buffer spacer or other parts may be interposed between the cell stack body 320 and the end plate 321a.

In the above embodiments, the gas passage is formed between the heat insulator 331 and the lid portions 320a2 which form the surface of the cell stack body 320 which faces the heat insulator 331 in an opposed manner. However, the configuration may be realized such that the heat insulator 331 is simply arranged so as to face the safety valves 320a5 positioned on the lid portions 320a2 of the cell stack body 320 without forming a gas passage which guides a gas to a specific direction. In this case, a gas discharged from the cell stack 32 impinges on a surface of the heat insulating body plate 331a so that the direction of the flow of the gas is changed, and the gas flows along a surface of the heat insulating body plate 331a and is diffused into the inside of a housing and is discharged to the outside through the exhaust sleeve 22 of the housing. Accordingly, an undesired surplus space for an exhaust tube or the like is not formed in the housing and hence, space saving can be achieved.

The heat insulator 331 which includes the heat insulating body plate 331a having a rectangular profile shape corresponds to the heat insulator having an approximately flat plate shape in the present invention. However, it is sufficient for "the heat insulator having an approximately flat plate shape in the present invention" that the heat insulator faces the safety valves in an opposed manner, and a discharged gas impinges on a surface of the heat insulator, and is diffused on the surface of the heat insulator. A shape of the heat insulator is not limited to a flat plate shape. Accordingly, the heat insulator may have any desired shape which conforms to the arrangement of other electrical components of the power source module such as a rounded rectangular shape or a polygonal shape. Further, with respect to "the heat insulator having an approximately flat plate shape in the present invention", provided that a surface of the heat insulator on which a discharged gas impinges has a larger size than other portions of the heat insulator, in other words, portions of the heat insulator other than a surface of the heat insulator on which a gas impinges has a small size, a space saving effect can be acquired. The approximately flat-plate shape of the heat insulator in the present invention is not limited by shapes of other portions. Accordingly, the heat insulator may have a flat plate shape as in the case of the heat insulating body plate 331a in the first embodiment, or may have a corrugated shape, a U shape or the like in cross section. Further, a surface of the heat insulator on which a discharged gas impinges may have a curved shape in cross section.

Second Embodiment

Figure 8:
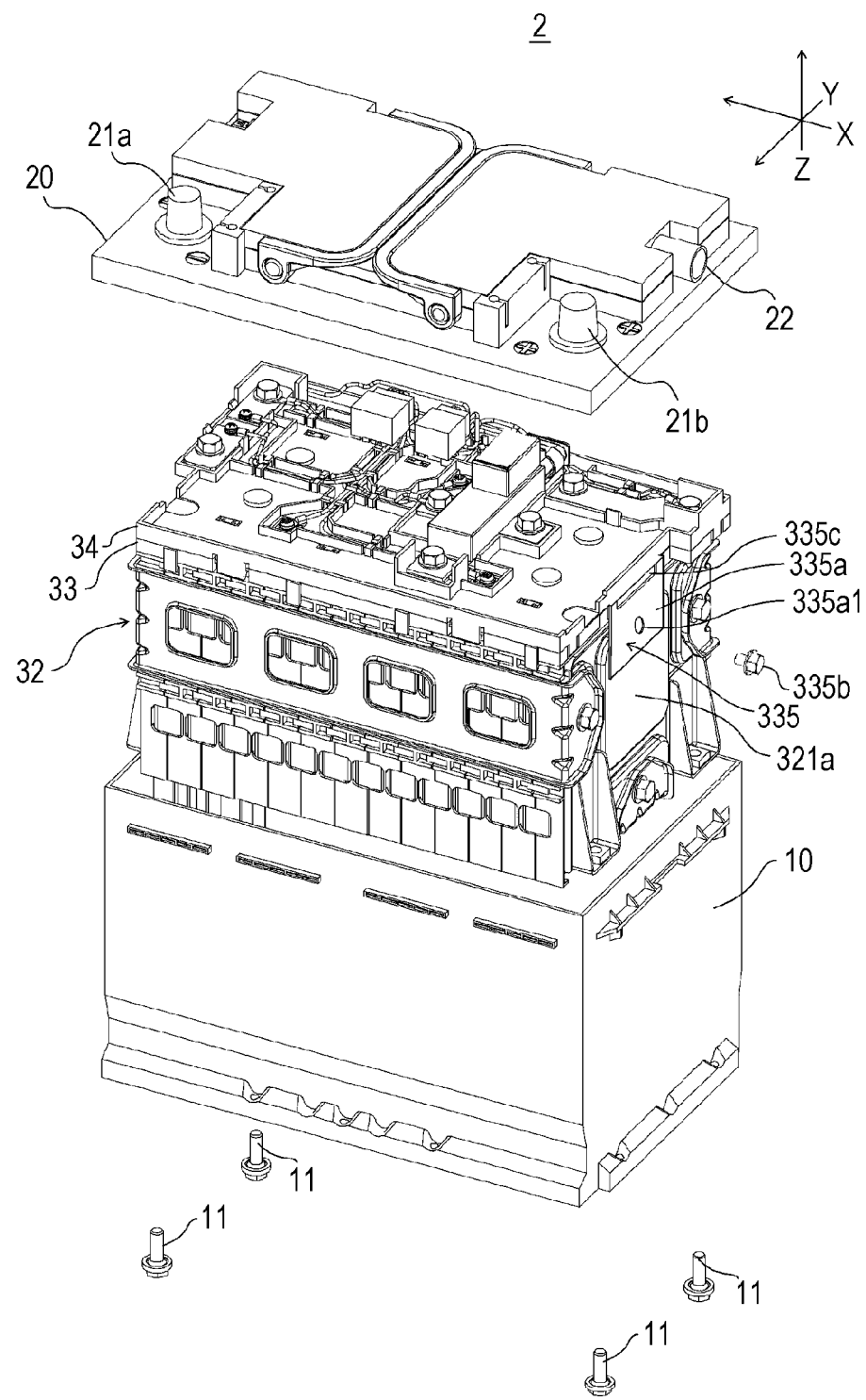
FIG. 8 is an exploded perspective view showing part of a power source pack of a second embodiment.

FIG. 8 is a perspective view, with a part exploded, schematically showing the configuration of a power source pack 2 according to a second embodiment of the present invention. In this embodiment, the constitutional elements identical to or corresponding to the constitutional elements shown in FIG. 1 to FIG. 7 are given the same symbols, and the detailed description of such constitutional elements is omitted.

As shown in FIG. 8, the power source pack 2 of the second embodiment is characterized in that a power source module 30 includes a heat insulator 335 as a heat insulator assembled into a bus bar assembly unit 33, wherein the heat insulator 335 is bent in the downward direction at both ends of the bus bar assembly unit 33, and the bent portions of the heat insulator 335 extend in the downward direction and reach side surfaces of a cell stack 32.

Angled portions 335a of the heat insulator 335 are portions which are bent downward and cover side surfaces of the cell stack 32. A through hole 335a1 is formed in a lower end portion of each angled portion 335b such that, in temporarily assembling the power source module 30, the through hole 335a1 is aligned with a mounting hole (not shown) formed in an end plate 321a. By inserting bolts 335b from the angled portions 335a and by fastening the bolts 335b to the end plates 321a, the heat insulator 335 and the cell stack 32 are fixed to each other. A slit 335c which communicates with a groove portion 330x of the bus bar assembly unit 33 is formed in an upper end of the angled portion 335a.

In the above-mentioned configuration, the angled portion 335a corresponds to the end surface portion in the present invention, and the slit 335c corresponds to the communication portion in the present invention.

The power source pack of the second embodiment having the above-mentioned configuration includes the heat insulator 335 having the angled portions 335a and hence, the power source pack 2 can acquire the following advantageous effects. That is, the heat insulator 335 is fixed to the pair of end plates 321a by way of the angled portions 335a so that the heat insulator 335 fastens the end plates 321a in cooperation with fastening bars 322a to 322c thus functioning as a holder which maintains a shape of the cell stack body 320.

Further, the heat insulator 335 is positioned on an upper surface of the cell stack 32. Accordingly, using the arrangement direction of batteries which form the cell stack body 320 as an axis of symmetry, the whole fastening bars including the fastening bars 322a to 322c are arranged such that the whole fastening bars extend in symmetry along the cell stack 32 in a Z-X plane and in an X-Y plane in the drawing with respect to the axis of symmetry. Accordingly, the performance of the holder can be enhanced. With such a configuration, rigidity of the cell stack 32 is increased so that mechanical strength of the power source module 30 can be increased and, eventually, durability of the power source pack 2 can be enhanced.

Further, the slit 335c is formed in the angled portion 335a, and the slit 335c communicates with a groove portion 330x formed in a bus bar assembly unit 33. Accordingly, in the same manner as the first embodiment, it is possible to provide a gas passage by which space saving can be achieved.

Figure 9A:
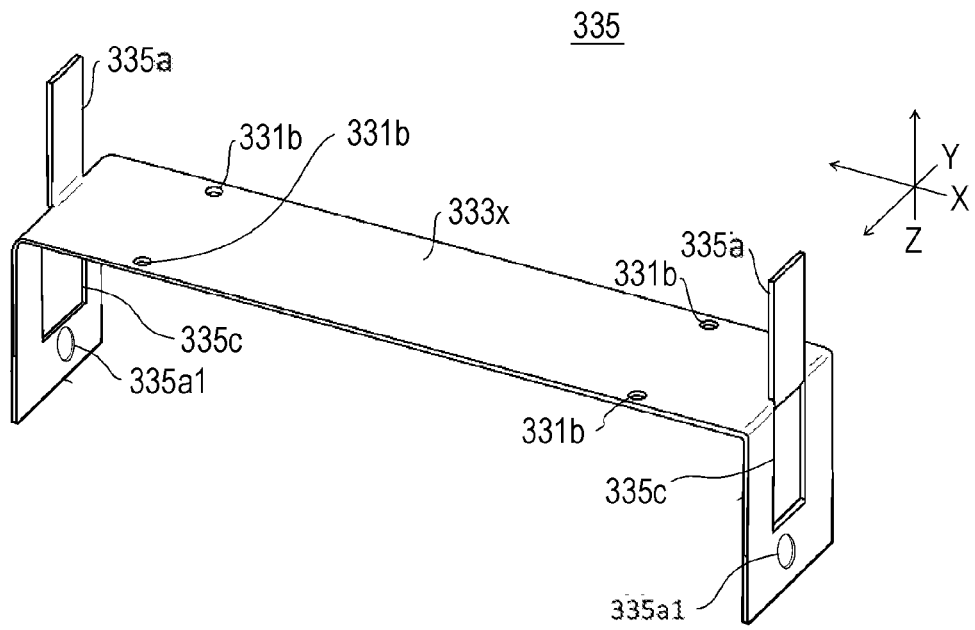
FIG. 9A is a perspective view showing another example of a heat insulating plate of the power source pack of the second embodiment.

The heat insulator 335 can be formed using a metal base material which has both ends thereof bent in an approximately U shape. The slit 335c which communicates with the gas passage is formed as an opening in the heat insulator 335 in the vicinity of a bent position. Alternatively, as shown in FIG. 9A, the heat insulator 335 may be formed such that a U-shaped cut is formed on a center portion of each of both end portions of one plate-shaped base material 333x, and respective portions which are separated by the cut are bent in the opposite directions. Particularly, in the example shown in FIG. 9A, an angled portion 335b is formed by bending a portion of each one of the angled portions 335a upward, and the angled portion 335b has an inverted shape of the opening 335c which communicates with the groove portion 330x formed in the frame body 330a of the bus bar assembly unit 33. The angled portions 335b can sandwich bus bar assembly unit 33 in the X axis direction in the drawing so that the angled portions 335b can be used for positioning between the bus bar assembly unit 33 and the electrical component sub unit 34 and for reinforcing the bus bar assembly unit 33 and the electrical component sub unit 34 at the time of fixing these members. The opening 335c corresponds to the communication portion in the present invention.

Figure 9B:
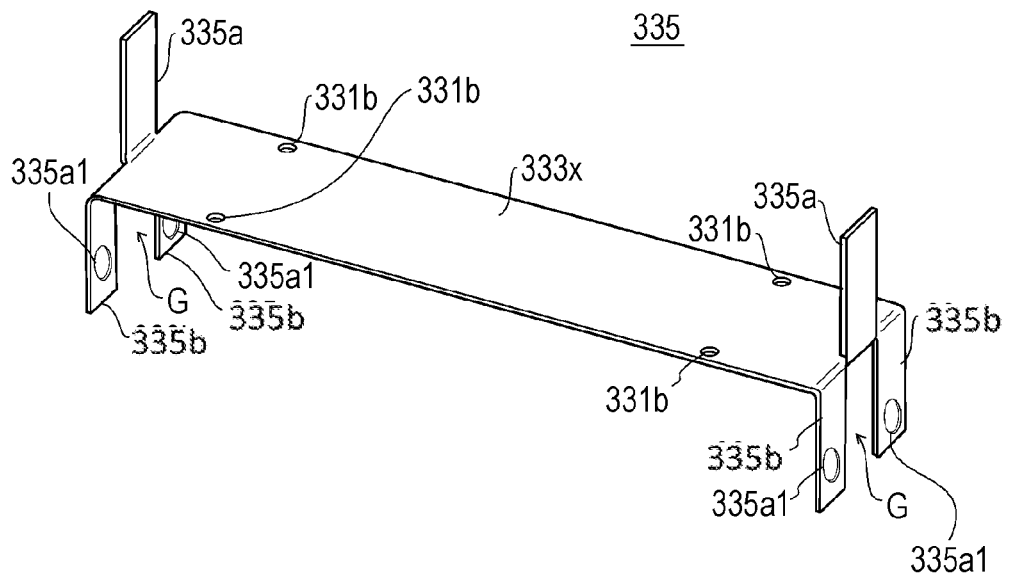
FIG. 9B is a perspective view showing still another example of a heat insulating plate of the power source pack of the second embodiment.

Further, as shown in FIG. 9B, angled portions 335b and an angled portion 335a may be formed such that two straight cuts which are parallel to each other are formed on a center portion of both end portions of a base material 333x, and respective portions which are separated from each other by the cuts are bent in the opposite directions. Also in this case, a gap G is formed due to the formation of a pair of angled portions 335b by cutting, and the gap G communicates with a groove portion 330x formed in a frame body 330a of a bus bar assembly unit 33. With such a configuration, a separate step for forming slits can be omitted so that the heat insulator 335 can be manufactured more easily. The gap G corresponds to the communication portion in the present invention.

In the above-mentioned description, although the heat insulator 335 has the angled portion 335a on both end portions thereof, the heat insulator 335 may have the angled portion 335a on either one of the end portions thereof. Further, the angled portion 335a may not be fixed to the end plate 321a. In this case, the angled portion 335a can be used for positioning between the bus bar assembly unit 33 and the cell stack 32 so that productivity of the power source packs can be enhanced. Although the description has been made assuming that the opening 335c or the like of the angled portion 335a corresponds to the communication portion in the present invention and communicates with the gas passage in the present invention, provided that the opening 335c allows a gas from the batteries 320a to pass therethrough, the opening 335c may allow a gas which flows through a passage different from the above-mentioned gas passage to pass therethrough.

In the above-mentioned description, the heat insulator in the present invention uses a heat insulator having the angled portions 335a fixed to the end plates 321a as the heat insulator 335.

Figure 10:
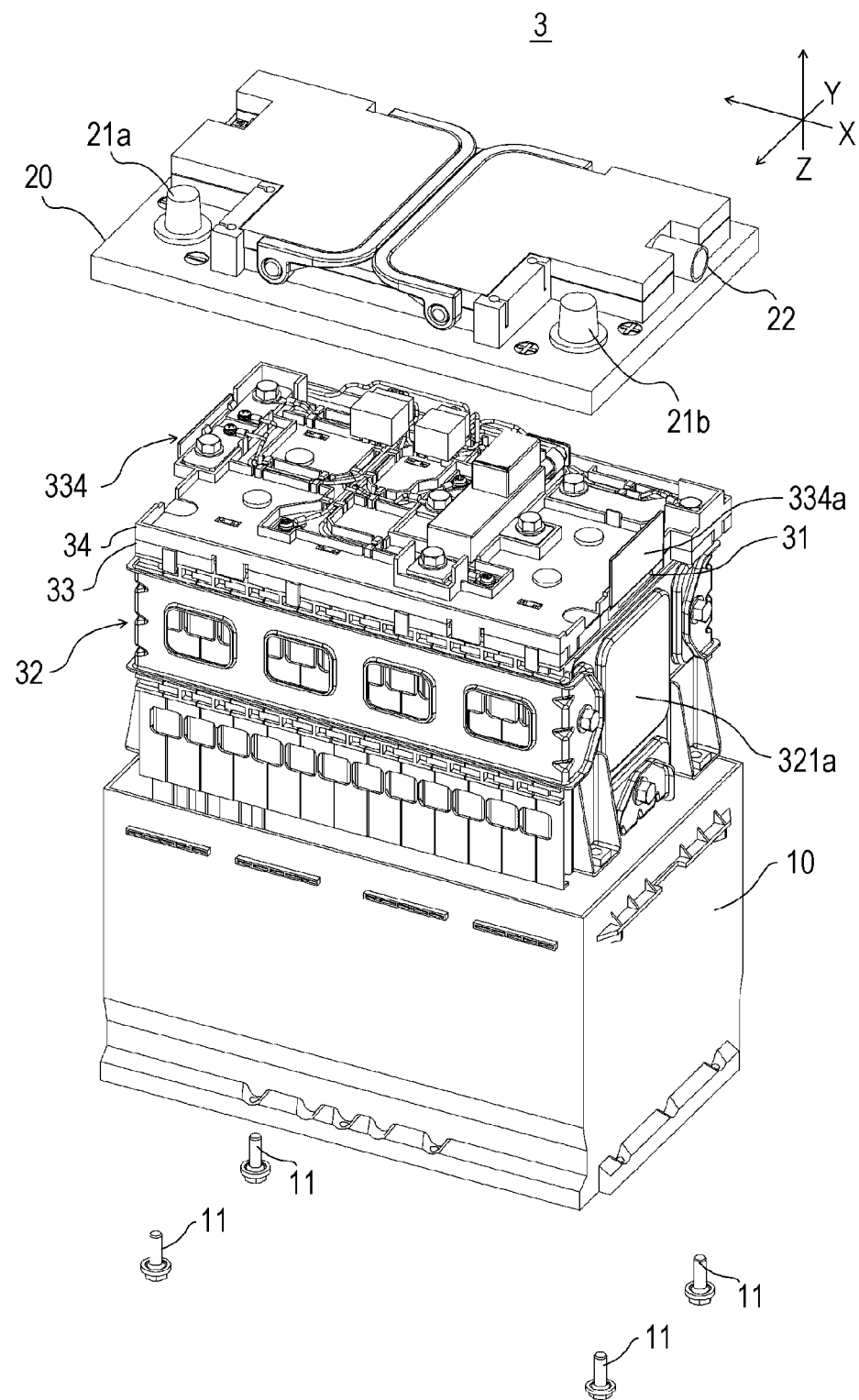
FIG. 10 is an exploded perspective view showing part of another example of the power source pack according to the embodiment.

The heat insulator in the present invention may be a heat insulator which is configured such that, as shown as a heat insulator 334 of a battery pack 3 in FIG. 10, the heat insulator is fixed to a lid portion 20 of a housing and includes only a plate-shaped angled portion 334a having a through hole 334a1. Also in this case, in the same manner as the configuration shown in FIG. 9A and FIG. 9B, the angled portion 334a can be used for positioning between a bus bar assembly unit 33 and an electrical component sub unit 34 and for reinforcing the bus bar assembly unit 33 and the electrical component sub unit 34 at the time of fixing these members.

In the above-mentioned description, the heat insulator in the present invention is formed using the metal-made heat insulating body plate 331a. However, the heat insulator may be made of a filler-containing synthetic resin, glass fiber or any other desired materials provided that the material has heat resistance.

In the above-mentioned description, the housing is the container having a rectangular parallelepiped profile and is constituted of the container body 10 and the lid portion 20 both of which are made of a synthetic resin and are hermetically sealed with each other by welding or the like. Alternatively, the housing may be made of metal, other materials or the combination of these materials. The housing may be formed by combining three or more members together. Further, a profile of the housing may be a cubic shape, a cylindrical shape or a polygonal columnar shape. That is, the housing in the present invention is not limited with respect to a shape, a specific material and the configuration. The exhaust sleeve 22 mounted on the housing is an example of an exhaust port in the present invention. However, provided that the exhaust port in the present invention allows the communication between the outside and the inside of the housing, a shape, a size and the like of the exhaust port may be desirably set, and the shape of the exhaust port is not limited to the shape of the cylindrical exhaust sleeve 22 of this embodiment. As one example, the exhaust port may be an opening which is formed in a wall body with a least height (length).

In the above-mentioned description, the energy storage devices used as the batteries for forming the cell stack are nonaqueous electrolyte secondary batteries represented by lithium ion secondary batteries. However, provided that the energy storage devices are batteries which can be charged and discharged by an electrochemical reaction, nickel-metal hydride batteries or other kinds of secondary batteries may be also used as the energy storage devices. Primary batteries may be used as the energy storage devices. Further, electric double layer capacitors or other kinds of capacitors may be used as the energy storage devices. That is, provided that the energy storage device of the present invention is an element which is formed by sealing an electrode assembly and an electrolyte solution in a storage container and can store electricity therein, the energy storage device of the present invention is not limited with respect to a specific method for generating an electromotive force.

That is, the present invention may be carried out in the form that various modifications are applied to the above-mentioned embodiments including the above-mentioned modifications without departing from the gist of the present invention.

The present invention having the above-mentioned configuration acquires an advantageous effect that a power source pack can achieve space saving, and an advantageous effect that the power source pack is effectively applicable to a power source pack including energy storage devices such as secondary batteries, for example.

What is claimed is:

1. A power source pack comprising:
   a housing having a bottom wall and side walls extending vertically form the bottom wall; and
   a power source module which is housed in the housing, and includes:
      a cell stack including a plurality of energy storage devices each having a safety valve; an electrical component unit disposed oppositely from the bottom wall and sandwiching the cell stack with the bottom wall; and
      a heat insulator positioned between the electrical component unit and the cell stack and having an approximately flat-plate shape,
   wherein the heat insulator faces and entirely covers the safety valves of the cell stack in an opposed manner in a direction in which the side walls extend from the bottom wall.

2. The power source pack according to claim 1, wherein a surface of the heat insulator and a surface of the cell stack which face each other in an opposed manner form a gas passage.

3. The power source pack according to claim 1, wherein the cell stack includes a pair of end plates which sandwiches the plurality of energy storage devices arranged in a row, and
   wherein the heat insulator is fixed to at least one of the end plates.

4. The power source pack according to claim 1, wherein the heat insulator extends along a first direction in which the plurality of energy storage devices are arranged in a row, and at least one end of the heat insulator has an end surface portion extending in a direction which intersects with the first direction, and
   wherein a communication portion which allows a gas generated from the energy storage devices to pass therethrough is formed in the end surface portion.

5. The power source pack according to claim 3, wherein the pair of end plates are fixed to the cell stack by a fastening bar extending in a first direction, and
   wherein the heat insulator is arranged on a second surface of the cell stack which is on a side opposite to a first surface of the cell stack on which the fastening bar is arranged.

6. The power source pack according to claim 1, further comprising a connecting part which connects the energy storage devices to each other,
   wherein the heat insulator is arranged on a third surface of the cell stack on which the connecting part is arranged, and
   wherein the heat insulator is configured not to project in a direction away from the cell stack than the connecting part.

7. The power source pack according to claim 1, wherein the housing is hermetically closed and an inner space thereof communicates with the outside only through an exhaust port.

8. The power source pack according to claim 1, wherein the heat insulator is arranged between the safety valves and the electrical component of the power source module.

9. The power source pack according to claim 1, further comprising:
   a pair of fastening bars provided to both end portions of the cell stack in the first direction along which the plurality of energy storage devices are arranged in a row; and
   an end plate mounted on the pair of fastening bars,
   wherein the end plate comprises the heat insulator.

10. The power source pack according to claim 1, wherein the heat insulator extends along a first direction in which the plurality of energy storage devices are arranged in a row, at least one end of the heat insulator has an end surface portion extending in a direction which intersects with the first direction and away from the cell stack.

11. A power source pack comprising:
    a housing having a bottom wall and side walls extending vertically form the bottom wall; and
    a power source module which is housed in the housing, and includes:
       a cell stack including a plurality of energy storage devices each having a safety valve;
       an electrical component unit disposed oppositely from the bottom wall and sandwiching the cell stack with the bottom wall; and
       a heat insulator positioned between the electrical component unit and the cell stack and having an approximately flat-plate shape,
    wherein the heat insulator entirely covers the safety valves, and is arranged between the safety valves and the electrical component unit of the power source module.

12. A power source module, comprising:
    a cell stack including a plurality of energy storage devices each having a safety valve;
    an electrical component unit formed on the cell stack; and
    a heat insulator positioned between the electrical component unit and the cell stack and having an approximately flat-plate shape, and facing and entirely covering the safety valves of the cell stack in an opposed manner in a direction from the cell stack toward the electrical component unit.

13. The power source module of claim 12, further comprising:
    a bus bar assembly unit which electrically connects the plurality of energy storage devices and is formed between the heat insulator and the cell stack.

14. The power source module of claim 13, wherein the electrical component unit is electrically connected to the bus bar assembly unit.

15. The power source module of claim 13, wherein the cell stack comprises a cover including first openings at a position corresponding to the safety valves of the cell stack, and the bus bar assembly unit includes a frame body including second openings at a position corresponding to the first openings of the cover.

16. The power source module of claim 15, wherein the frame body includes a groove portion at a position corresponding to the second openings, and the heat insulator is formed in the groove portion.

17. The power source module of claim 16, wherein the groove portion comprises:
   a lower stage surface which extends along an arrangement direction of the safety valves and in which the second openings are formed; and
   a pair of intermediate stage surfaces which are formed along edges of the lower stage surface.

18. The power source module of claim 17, wherein the heat insulator is fitted in the pair of intermediate stage surfaces of the groove portion, and fixed to the frame body.

* * * * *